US012793610B2

(12) United States Patent
Shih et al.

(10) Patent No.: US 12,793,610 B2
(45) Date of Patent: Nov. 10, 2026

(54) DISPLAY DEVICE AND LED DRIVING DEVICE THEREOF

(71) Applicant: Lextar Electronics Corporation, Hsinchu City (TW)

(72) Inventors: Kai-Hsiang Shih, Hsinchu (TW); Zheng-Shuo Tung, Hsinchu (TW); Chien-Nan Yeh, Hsinchu (TW)

(73) Assignee: Ennostar Corporation, Hsinchu City (TW)

( * ) Notice: Subject to any disclaimer, the term of this patent is extended or adjusted under 35 U.S.C. 154(b) by 0 days.

(21) Appl. No.: 18/891,882

(22) Filed: Sep. 20, 2024

(65) Prior Publication Data

US 2025/0182679 A1 Jun. 5, 2025

(30) Foreign Application Priority Data

Nov. 30, 2023 (TW) ................................ 112146565

(51) Int. Cl.
*G09G 3/32* (2016.01)
*G09G 3/20* (2006.01)

(52) U.S. Cl.
CPC ............ *G09G 3/32* (2013.01); *G09G 3/2018* (2013.01); *G09G 2310/08* (2013.01); *G09G 2330/00* (2013.01)

(58) Field of Classification Search
CPC ...... G09G 3/2014; G09G 3/2018; G09G 3/32; G09G 2310/08; G09G 2330/00
See application file for complete search history.

(56) References Cited

U.S. PATENT DOCUMENTS

| | | | | |
|---|---|---|---|---|
| 9,390,647 | B2 | 7/2016 | Li et al. | |
| 9,485,827 | B2 | 11/2016 | Li et al. | |
| 10,902,793 | B2 * | 1/2021 | Oh | G09G 3/3266 |
| 12,183,292 | B2 * | 12/2024 | Hu | G09G 3/3406 |
| 2021/0185780 | A1 | 6/2021 | Lula et al. | |
| 2022/0383814 | A1 * | 12/2022 | Van Eessen | G09G 3/3233 |
| 2023/0335069 | A1 * | 10/2023 | Liu | G09G 3/3406 |
| 2024/0038119 | A1 * | 2/2024 | Zhang | G09G 3/20 |
| 2024/0365448 | A1 * | 10/2024 | Shih | H05B 45/325 |

FOREIGN PATENT DOCUMENTS

| | | | |
|---|---|---|---|
| TW | 201134292 | A | 10/2011 |
| TW | 202334932 | A | 9/2023 |

* cited by examiner

*Primary Examiner* — Julie Anne Watko
(74) *Attorney, Agent, or Firm* — Patterson + Sheridan, LLP

(57) ABSTRACT

An LED driving device includes an LED load, a control module and a driving module. The LED load has a driving characteristic and a load energy. The control module provides a frame time and a first pulse width to calculate a total pulse number in the frame time. The control module generates a pulse intensity and a second pulse width according to the driving characteristic of the LED load. The control module generates a pulse density according to the load energy of the LED load. The driving module generates a driving signal to the LED load according to the pulse intensity, the second pulse width and the pulse density.

17 Claims, 10 Drawing Sheets

1000

DISPLAY DEVICE AND LED DRIVING DEVICE THEREOF

CROSS REFERENCE TO RELATED APPLICATIONS

This application claims priority of TW Patent Application No. 112146565, filed on Nov. 30, 2023, and the content of the entirety of which is incorporated by reference herein.

BACKGROUND OF THE DISCLOSURE

Field of the Disclosure

The disclosure relates to a display device and a driving device thereof, and in particular, to a display device and an LED driving device thereof capable of improving the PWM driving effect.

Description of the Related Art

In previous applications, traditional pulse width modulation (PWM) is often used for linear modulation of the voltage or the current of a system circuit. However, as the frequency of the pulse width modulation becomes higher, a driving transient problem that is often ignored becomes more obvious. For example, as the frequency of the pulse width modulation become faster, the proportion of the transient region of the driving signal to the overall driving signal becomes higher. Therefore, when the operating frequency is higher, the linearity of the driving signal with the pulse width modulation may be worse, and the influence of the driving transient problem is more obvious especially at a lower duty ratio. In addition, when the duty ratio setting is low, the peak value of the driving signal may decrease, affecting the driving characteristics of the driving terminal (such as the load).

BRIEF SUMMARY OF THE DISCLOSURE

The disclosure provides a display device and an LED driving device thereof, thereby increasing the linearity of the adjustment of the driving signal, and improving the transient problem of the PWM driving.

An embodiment of the disclosure provides an LED driving device, which includes an LED load, a control module and a driving module. The LED load is configured to have a driving characteristic and a load energy. The control module is configured to provide a frame time and a first pulse width to calculate a total pulse number in the frame time, generate a pulse intensity and a second pulse width according to the driving characteristic of the LED load, and generate a pulse density according to the load energy of the LED load. The driving module is configured to generate a driving signal to the LED load according to the pulse intensity, the second pulse width and the pulse density.

An embodiment of the disclosure provides a display device, which includes the above-mentioned LED driving device.

According to the display device and the LED driving device thereof disclosed by the present disclosure, the control module provides the frame time and the first pulse width to calculate the total pulse number in the frame time, generates the pulse intensity and the second pulse width according to the driving characteristic of the LED load, and generates the pulse density according to the load energy of the LED load, and the driving module generates the driving signal to the LED load according to the pulse intensity, the second pulse width and the pulse density. Therefore, it may increase the linearity of the adjustment of the driving signal, and decrease the impact on the driving characteristic of the driving terminal (i.e., the LED load).

BRIEF DESCRIPTION OF THE DRAWINGS

The disclosure can be fully understood by reading the subsequent detailed description and examples with references made to the accompanying drawings, wherein.

DETAILED DESCRIPTION OF THE DISCLOSURE

Technical terms of the disclosure are based on general definition in the technical field of the disclosure. If the disclosure describes or explains one or some terms, definition of the terms is based on the description or explanation of the disclosure. Each of the disclosed embodiments has one or more technical features. In possible implementation, a person skilled in the art would selectively implement all or some technical features of any embodiment of the disclosure or selectively combine all or some technical features of the embodiments of the disclosure.

In each of the following embodiments, the same reference number represents the same or a similar element or component.

Figure 1:
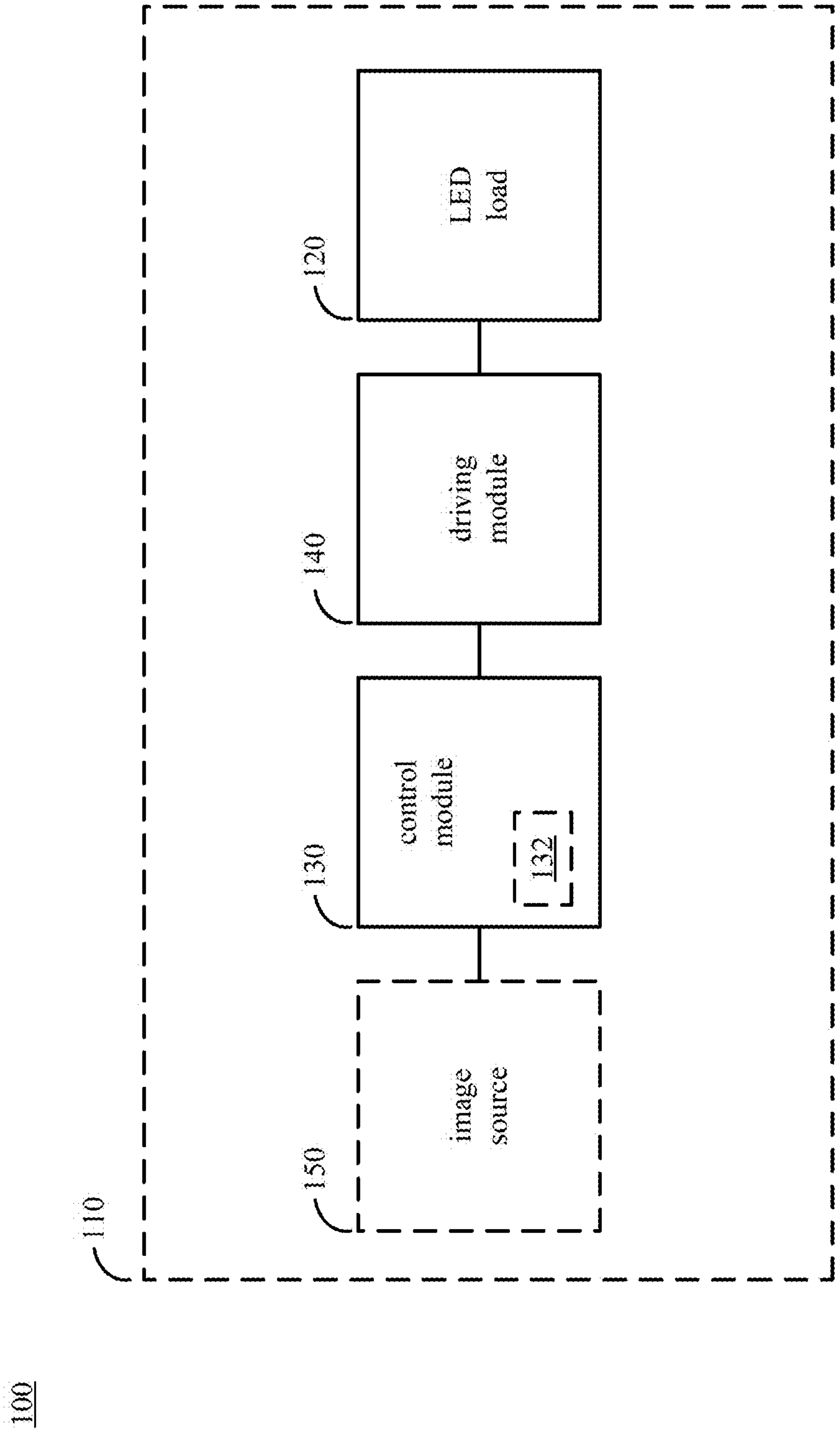
FIG. 1 is a schematic view of a display device according to an embodiment of the disclosure.

FIG. 1 is a schematic view of a display device according to an embodiment of the disclosure. Please refer to FIG. 1. The display device 100 may include an LED driving device 110. The LED driving device 110 may include an LED load

120, a control module 130 and a driving module 140. The LED load 120 may have a driving characteristic and a load energy.

The control module 130 may provide a frame time and a first pulse width to calculate a total pulse number in the frame time. For example, assuming that the frame time is 20 milliseconds (ms) and the first pulse width is 1 ms, the total pulse number in the frame time is 20 pulses, but the disclosure is not limited thereto. For example, the above-mentioned frame time may be a time during which one frame of the display device 100 is displayed. Taking a frame rate as 50 Hz as an example, i.e., 50 frames are displayed in 1 second, and the display time of each frame is 20 ms, i.e., the frame time is 20 ms. In some embodiments, the display device 100 may further include an image source 150, and the above-mentioned frame rate may be provided by the image source to the control module 130, so that the control module 130 may calculate the duration of the corresponding frame time according to the frame rate provided by the image source. In addition, in some embodiments, the frame rate may be preset by the user in the control module 130 (e.g., frame rate 132 of FIG. 1) and generated by the control module 130, so that the control module 130 may calculate the duration of the corresponding frame time according the frame time generated thereof.

Then, the control module 130 may generate a pulse intensity and a second pulse width according to the driving characteristic of the LED load 120, and generate a pulse density according to the load energy of the LED load 120. In some embodiments, the pulse density may correspond to the pulse number, and the pulse number corresponding to the pulse density may be less than or equal to the total pulse number. That is, in a frame time with the same first pulse width, when the pulse density is lower, the pulse number is smaller; when the pulse density is higher, the pulse number is larger. In addition, when the pulse density is at its maximum value, the pulse number corresponding to the pulse density may be equal to the total pulse number. When the pulse density is not at its maximum value (for example, less than the maximum value), the pulse number corresponding to the pulse density may be less than the total pulse number.

The driving module 140 may be electrically connected to the control module 130. The driving module 140 may receive the pulse intensity, the second pulse width and the pulse density, and generate a driving signal to the LED load 120 according to the pulse intensity, the second pulse width and the pulse density to drive the LED load 120, so that the LED load 120 operates.

In the embodiment, the LED load 120 may include a light emitting element driven according to the pulse width modulation (PWM). In some embodiments, the light emitting element may be a light emitting diode (LED) chip or a package structure including LED chips. In some embodiments, the LED load 120 may include a plurality of LED pixels. Furthermore, in the display device 100, the LED load 120 includes RGB pixels (not shown) formed by the LED chips or the package structures including the LED chips, wherein the LED chips operate according to the driving signal of the driving module 140. The driving characteristic of the LED load 120 includes the first brightness, the luminous wavelength and the luminous efficiency of the LED load 120 (LED). The control module 130 generates the pulse intensity and the second pulse width according to the driving characteristic of the LED load 120 (LED), so as to adjust the driving characteristic of the LED load 120 (LED). In some embodiments, the second pulse width is proportional to the first brightness. For example, when the second pulse width is larger, the first brightness of the LED load 120 (LED) is higher. When the second pulse width is smaller, the first brightness of the LED load 120 (LED) is lower. In the embodiment, the above-mentioned first brightness may be the maximum brightness of the LED load 120 (LED).

The control module 130 generates a pulse density according to the load energy of the LED load 120 (LED). Furthermore, the load energy of the LED load 120 (LED) may be the energy of the driving signal that the driving module 140 (the LED driving device 110) needs to provide to the LED load 120 (LED). In the embodiment, the above-mentioned load energy=an energy of a pulse multiplied by the pulse number. For example, using the LED load 120 including the LED as an example, assuming that the current supplied to the LED load 120 (LED) is 1 mA, the forward voltage (VF) of the LED load 120 (LED) is 2.8V, and the time corresponding to the pulse width is 1 μs, then the energy of the pulse (W)=P*t=I*V*t=1 mA*2.8V*1 μs=2.8n joule (J), wherein P is the power and is defined as the rate of the work done or energy consumed per unit time t (second), I is the current supplied to the LED load 120 (LED), V is the forward voltage of the LED load 120 (LED), and t is the time corresponding to the pulse width. In addition, assuming that the above-mentioned load energy is 280 nJ, then 280 nJ (the load energy)=2.8 nJ (the energy of the pulse)*the pulse number, and therefore the pulse number is 100. The rest of the load energies may be deduced by analogy.

In some embodiments, the load energy of the LED load 120 may correspond to the second brightness of the LED load 120 (LED), and the pulse density is proportional to the second brightness of the LED load 120 (LED). For example, when the pulse density is larger, it indicates that the load energy of the LED load 120 is larger, and the second brightness of the LED load 120 (LED) is higher. When the pulse density is smaller, it indicates that the load energy of the LED load 120 is smaller, and the second brightness of the LED load 120 (LED) is lower. In the embodiment, the second brightness is, for example, less than or equal to the first brightness.

In some embodiments, the pulse intensity is proportional to the first brightness of the LED load 120 (LED) and related to the luminous efficiency and the luminous wavelength of the LED load 120 (LED). For example, when the pulse intensity is higher, the first brightness of the LED load 120 (LED) is higher. When the pulse intensity is smaller, the first brightness of the LED load 120 (LED) is lower. In addition, the magnitude of the pulse intensity may affect the magnitude of the luminous efficiency and the magnitude of the luminous wavelength of the LED load 120 (LED), and the luminous wavelength of the LED load 120 (LED) is related to the luminous color. In addition, when the LED load 120 includes an LED, the luminous efficiency of the LED is related to the material and the die size of the LED. For the LEDs with different materials, the curves of current versus efficiency may be different. Furthermore, the pulse intensity corresponds to the second pulse width. For example, when the pulse intensity is larger, the second pulse width is smaller. When the pulse intensity is smaller, the second pulse width is larger.

Therefore, in an application where the LED load 120 is the LED, the present disclosure determines the required driving characteristics of the LED load 120 (LED) by adjusting the pulse intensity and the second pulse width (for example, determine the luminous wavelength, the maximum brightness (such as the first brightness) and the luminous efficiency of the LED load 120 (LED)), then fixes the magnitudes of the pulse intensity and the second pulse width, and finally linearly adjusts the magnitude of the brightness (such as the second brightness) of the LED load 120 by adjusting the pulse density, and this brightness (such as the second brightness) does not exceed the maximum brightness (such as the first brightness).

Figure 2A:
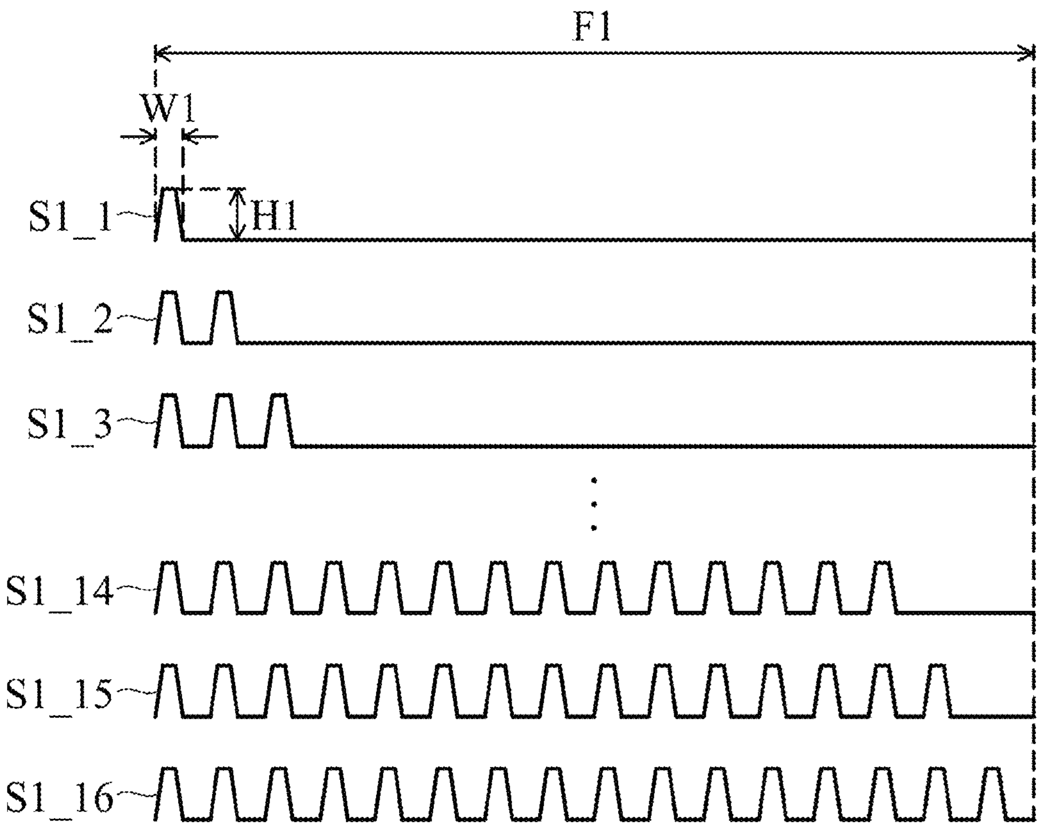
FIG. 2A is a schematic view of a driving signal according to an embodiment of the disclosure.
Figure 2B:
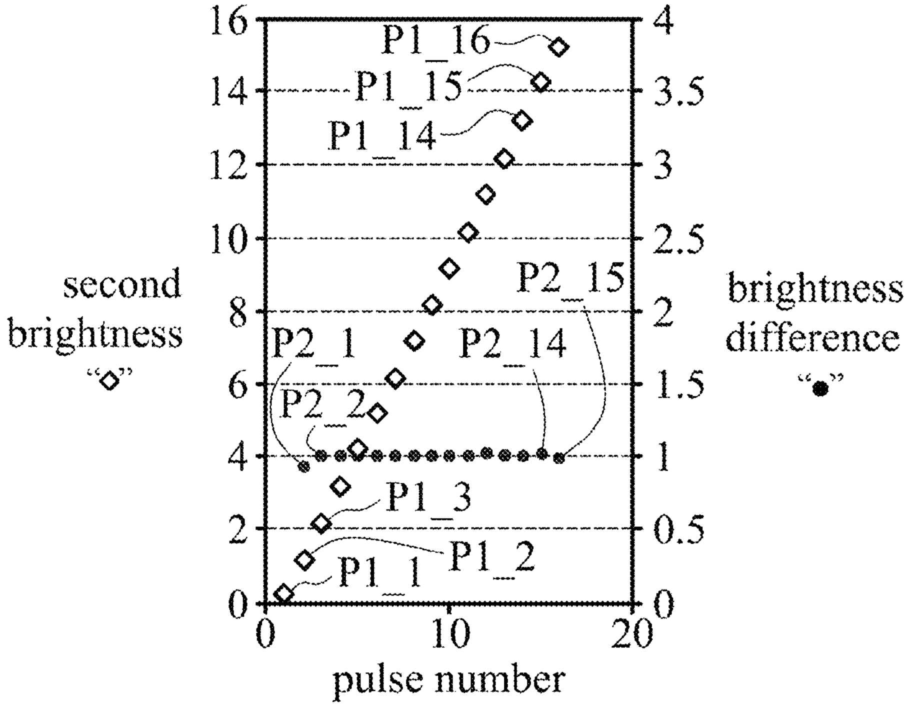
FIG. 2B is a schematic view of the pulse number of a driving signal, a second brightness of a load and a brightness difference according to another embodiment of the disclosure.

FIG. 2A is a schematic view of a driving signal according to an embodiment of the disclosure. FIG. 2B is a schematic view of the pulse number of a driving signal, a second brightness of a load and a brightness difference according to another embodiment of the disclosure. In FIG. 2A, the reference numbers "S1_1"~"S1_16" respectively represent 16 driving signals, the reference number "W1" represents the pulse width, and the reference number "H1" represent the pulse intensity. In FIG. 2A, the pulse in the driving signal is not a complete square wave, but has a slope on the rising edge and falling edge of the pulse, and this slope is the transient phenomenon caused by the pulse being turned on and off. In addition, the rising edge of the pulse corresponds to the pulse being turned on, and the falling edge of the pulse being turned off. Furthermore, the pulse actually contains noise.

In addition, it can be seen from FIG. 2A that in the same frame time F1, the pulse intensities H1 and the pulse widths W1 of the driving signals S1_1~S1_16 are fixed, and the pulse densities of the driving signals S1_1~S1_16 are different, i.e., the pulse numbers of the driving signals S1_1~S1_16 are different. The pulse number of the driving signal S1_1 is 1, the pulse number of the driving signal S1_2 is 2, the pulse number of the driving signal S1_3 is 3, . . . , the pulse number of the driving signal S1_14 is 14, the pulse number of the driving signal S1_15 is 15 and the pulse number of the driving signal S1_16 is 16.

In FIG. 2B, the reference numbers "P1_1"~"P1_16" respectively represent the second brightness of the LED load 120 corresponding to the driving signals S1_1~S1_16, and the reference numbers "P2_1"~"P2_15" respectively represent the brightness differences between adjacent ones of the second brightnesses P1_1~P1_16. It can be seen from FIG. 2B that the second brightness of the LED load 120 corresponding to the driving signal S1_1 is P1_1, the second brightness of the LED load 120 corresponding to the driving signal S1_2 is P1_2, the second brightness of the LED load 120 corresponding to the driving signal S1_3 is P1_3, . . . , the second brightness of the LED load 120 corresponding to the driving signal S1_14 is P1_14, the second brightness of the LED load 120 corresponding to the driving signal S1_15 is P1_15, and the second brightness of the LED load 120 corresponding to the driving signal S1_16 is P1_16. In addition, the brightness difference between the second brightness P1_1 and the second brightness P1_2 is P2_1, the brightness difference between the second brightness P1_2 and the second brightness P1_3 is P2_2, . . . , the brightness difference between the second brightness P1_14 and the second brightness P1_15 is P2_14, and the brightness difference It can be seen from FIG. 2A and FIG. 2B that the larger pulse density (the pulse number) of the driving signal may correspond to the higher second brightness of the LED load 120, the smaller pulse density (the pulse number) of the driving signal may correspond to the lower second brightness of the LED load 120, and the values of these 15 second brightness differences P2_1~P2_15 are close (i.e., the brightness difference does not change much), so as to increase the linearity of the adjustment of the driving signal, and increase the convenience of use. That is, in the embodiment, after the pulse intensity and the second pulse width are determined through the driving characteristic, the linear adjustment of the magnitude of the brightness may be achieved by adjusting the pulse density regardless of the magnitude of the second pulse width. Therefore, the LED driving device 110 of the disclosure may provide the LED load 120 (LED) to maintain a linear increase in brightness under the high-frequency pulse width modulation (PWM) driving, and the LED load 120 (LED) may not be affected by the transient phenomenon caused by the pulse being turned on and off, resulting in non-linear of the magnitude of the brightness.

Figure 3A:
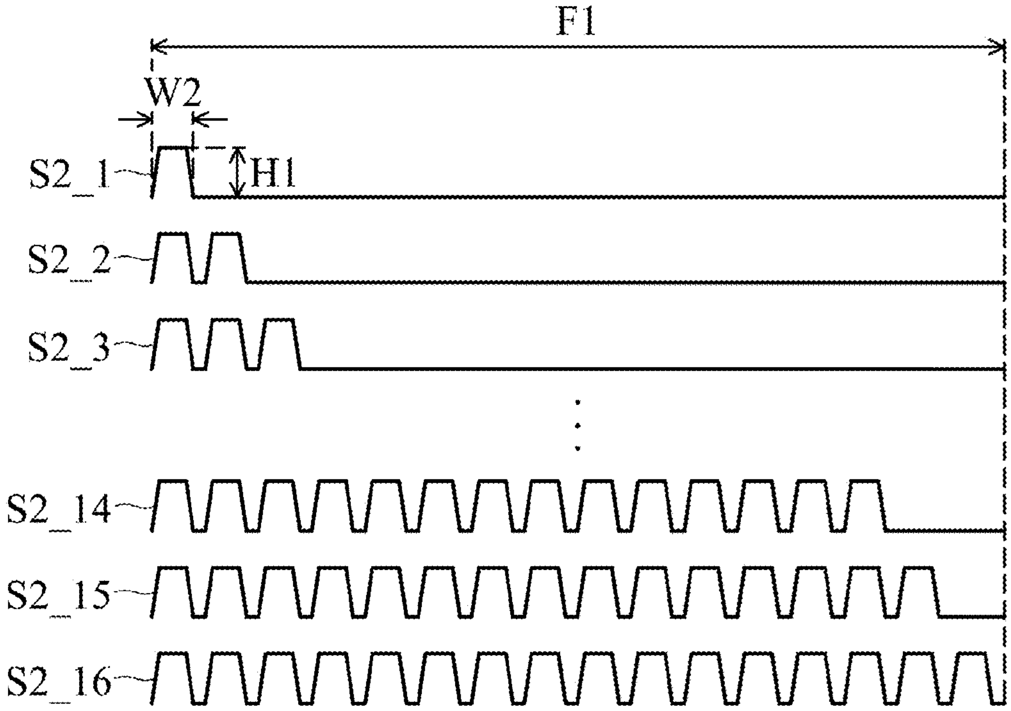
FIG. 3A is a schematic view of a driving signal according to an embodiment of the disclosure.
Figure 3B:
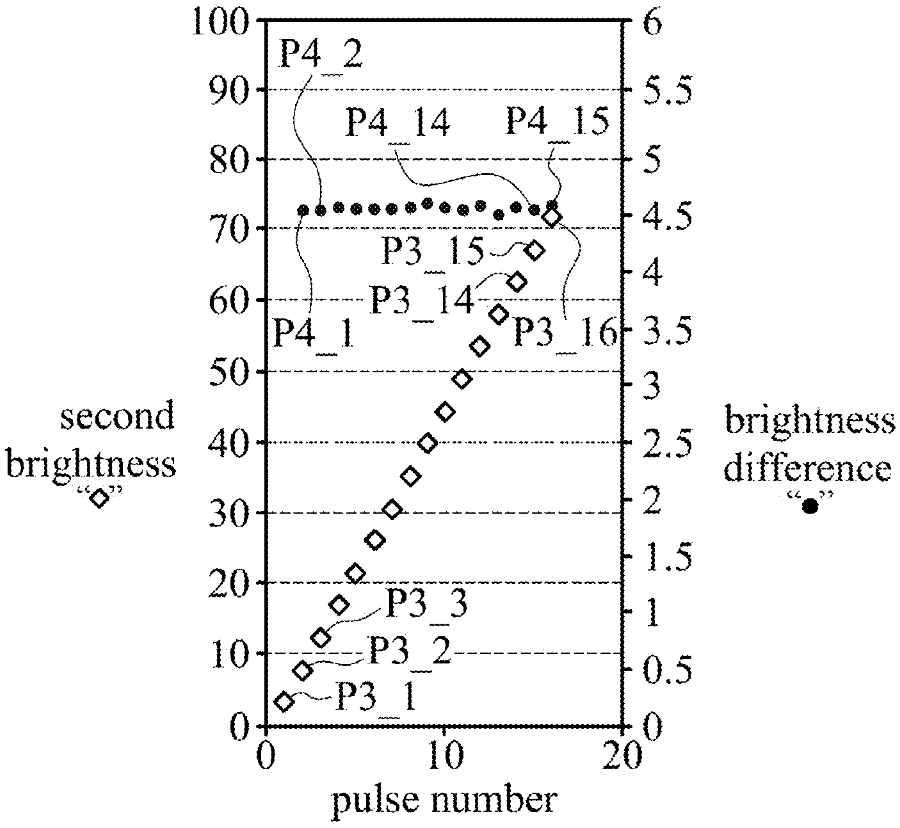
FIG. 3B is a schematic view of the pulse number of a driving signal, a second brightness of a load and a brightness difference according to another embodiment of the disclosure.

FIG. 3A is a schematic view of a driving signal according to an embodiment of the disclosure. FIG. 3B is a schematic view of the pulse number of a driving signal, a second brightness of a load and a brightness difference according to another embodiment of the disclosure. In FIG. 3A, the reference numbers "S2_1"~"S2_16" respectively represent the driving signals, the reference number "W2" represents the pulse width, and the reference number "H1" represent the pulse intensity.

In addition, it can be seen from FIG. 3A that in the same frame time F1, the pulse intensities H1 and the pulse widths W1 of the driving signals S2_1~S2_16 are fixed, and the pulse densities of the driving signals S2_1~S2_16 are different, i.e., the pulse numbers of the driving signals S2_1~S2_16 are different. The pulse number of the driving signal S2_1 is 1, the pulse number of the driving signal S2_2 is 2, the pulse number of the driving signal S2_3 is 3, . . . , the pulse number of the driving signal S2_14 is 14, the pulse number of the driving signal S2_15 is 15 and the pulse number of the driving signal S2_16 is 16. In FIG. 3A, the pulse in the driving signal is not a complete square wave, but has a slope on the rising edge and falling edge of the pulse, and this slope is the transient phenomenon caused by the pulse being turned on and off. In addition, the rising edge of the pulse corresponds to the pulse being turned on, and the falling edge of the pulse being turned off. Furthermore, the pulse actually contains noise.

In FIG. 3B, the reference numbers "P3_1"~"P3_16" respectively represent the second brightness of the LED load 120 corresponding to the driving signal S2_1~S2_16, and the reference numbers "P4_1"~"P4_15" respectively represent the brightness difference between the second brightness P3_1~P3_16. It can be seen from FIG. 3B that the second brightness of the LED load 120 corresponding to the driving signal S2_1 is P3_1, the second brightness of the LED load 120 corresponding to the driving signal S2_2 is P3_2, the second brightness of the LED load 120 corresponding to the driving signal S2_3 is P3_3, . . . , the second brightness of the LED load 120 corresponding to the driving signal S2_14 is P3_14, the second brightness of the LED load 120 corresponding to the driving signal S2_15 is P3_15 and the second brightness of the LED load 120 corresponding to the driving signal S2_16 is P3_16. In addition, the brightness difference between the second brightness P3_1 and the second brightness P3_2 is P4_1, the brightness difference between the second brightness P3_2 and the second brightness P3_3 is P4_2, . . . , the brightness difference between the second brightness P3_14 and the second brightness P3_15 is P4_14, and the brightness difference between the second brightness P3_15 and the second brightness P3_16 is P4_15.

It can be seen from FIG. 3A and FIG. 3B that the pulse widths W2 of the driving signals S2_1~S2_16 are greater than the pulse widths W1 of the driving signals S1_1~S_16 in FIG. 2A, and the second brightness of the LED load 120 of the driving signals S2_1~S2_16 is higher than the second brightness of the LED load 120 of the driving signals S1_1~S_16 in FIG. 2A. In addition, the larger pulse density (the pulse number) of the driving signal may correspond to the higher second brightness of the LED load 120, the smaller pulse density (the pulse number) of the driving signal may correspond to the lower second brightness of the LED load 120, and the values of these 15 second brightness differences P4_1~P4_15 are close (i.e., the brightness difference does not change much), so as to increase the linearity of the adjustment of the driving signal, and increase the convenience of use. That is, in the embodiment, after the pulse intensity and the second pulse width are determined through the driving characteristic, the linear adjustment of the second brightness may be achieved by adjusting the pulse density regardless of the magnitude of the second pulse width.

Therefore, the LED driving device 110 of the disclosure may provide the LED load 120 (LED) to maintain a linear increase in brightness under the high-frequency pulse driving, and even if the pulse has a driving transient, for example, the pulse of the driving signal in FIG. 2A or FIG. 3A is not a complete square wave, the LED load 120 (LED) may not be affected by the transient phenomenon caused by the pulse being turned on and off, resulting in non-linear of brightness adjustment, and it is also not affected by frequency. In addition, when the duty ratio is low, under the high-frequency pulse driving, the problem of peak drop of the driving signal may be avoided, and the driving characteristic of the driving terminal (i.e., the LED load 120) may be decreased from being affected.

Figure 4:
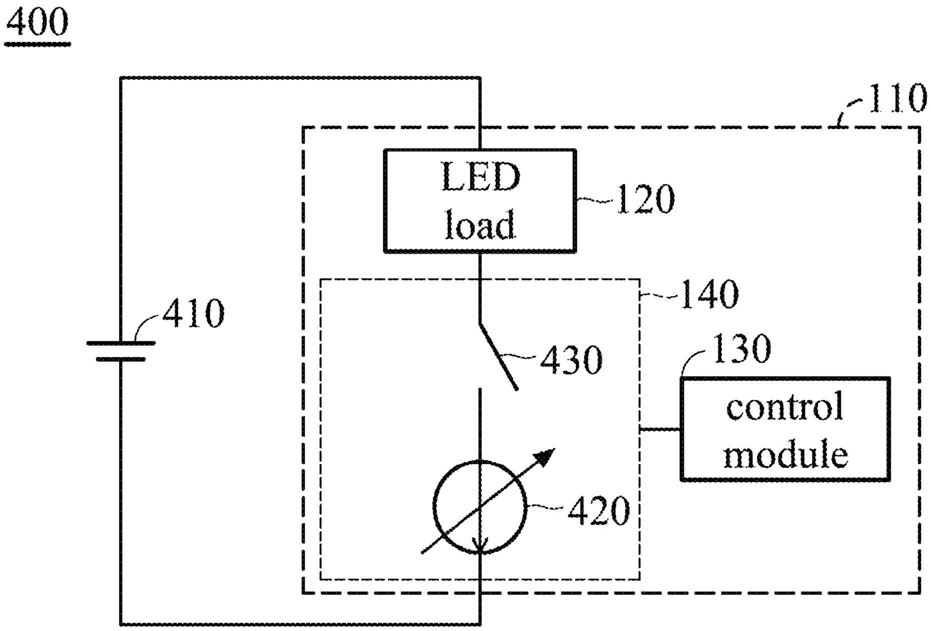
FIG. 4 is a schematic view of a display device according to an embodiment of the disclosure.

FIG. 4 is a schematic view of a display device according to an embodiment of the disclosure. In the embodiment, the display device 400 may be a light emitting diode display. Please refer to FIG. 4. The display device 400 may include an LED driving device 110 and a power source 410. The LED driving device 110 may include an LED load 120, a control module 130 and the driving module 140. In the embodiment, the LED load 120, the LED driving device 110, the control module 130 and the driving module 140 in FIG. 4 are the same or similar to the LED load 120, the LED driving device 110, the control module 130 and the driving module 140 in FIG. 1. Accordingly, the LED load 120, the LED driving device 110, the control module 130 and the driving module 140 in FIG. 4 may refer to the description of the embodiment of FIG. 1, and the description thereof is not repeated herein.

The power source 410 may be electrically connected to the LED load 120 and the driving module 140. In the embodiment, the power source 410 may be a voltage source, but the disclosure is not limited thereto. The driving module 140 may include a power source 420 and a switch unit 430. In the embodiment, the power source 420 may be a current source, but the disclosure is not limited thereto. The switch unit 430 may be electrically connected between the LED load 120 and the power source 420.

The power source 420 and the switch unit 430 may generate the driving signal to the LED load 120 according to the pulse intensity, the pulse width and the pulse density generated by the control module 130. In the embodiment, the current magnitude of the power source 420 (i.e., the current source) may be related to the pulse intensity. That is, when the pulse intensity is larger, the current of the power source 420 (i.e., the current source) is larger. When the pulse intensity is smaller, the current of the power source 420 (i.e., current source) is smaller.

In addition, the on time of the switch unit 430 may be related to the pulse width. That is, when the pulse width is larger, the on time of the switch unit 430 is longer. When the pulse width is smaller, the on time of the switch unit 430 is shorter. Furthermore, the number of turning on the switch unit 430 may be related to the pulse density. That is, when the pulse density (the pulse number) is larger, the number of turning on the switch unit 430 becomes more. When the pulse density (the pulse number) is smaller, the number of turning on the switch unit 430 becomes less.

As mentioned above, the driving module 140 may adjust the current magnitude of the power source 420 (i.e., the current source), the on time of the switch unit 430 and the number of turning on the switch unit 430 according to the pulse intensity, pulse width and the pulse density generated by the control module 130, so as to generate the corresponding driving signal to the LED load 120. Therefore, it may effectively increase the linearity of the adjustment of the driving signal, decrease the impact on the driving characteristic of the driving terminal (i.e., the LED load 120), and increase the convenience of use.

Figure 5:
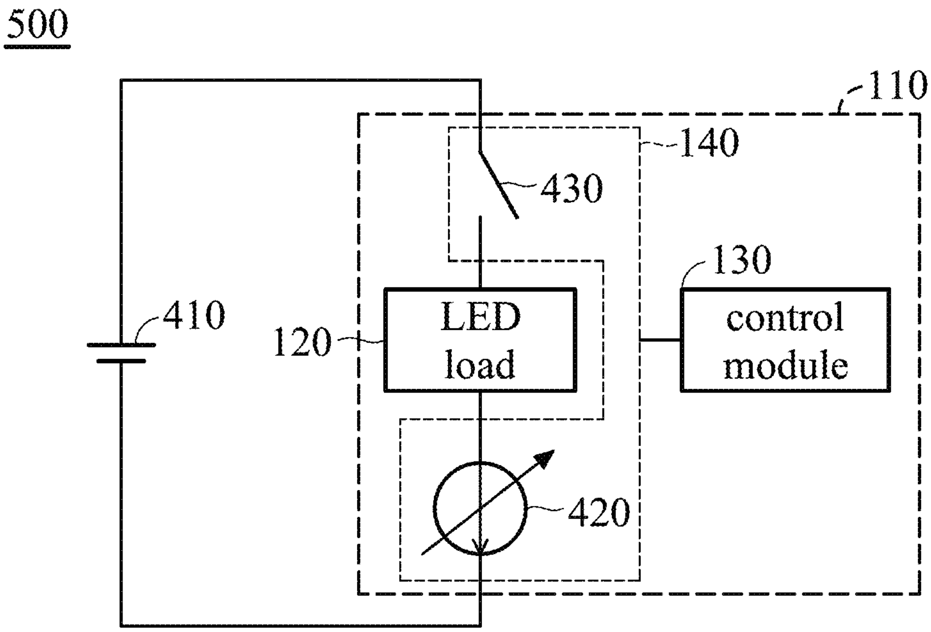
FIG. 5 is a schematic view of a display device according to an embodiment of the disclosure.

FIG. 5 is a schematic view of a display device according to an embodiment of the disclosure. In the embodiment, the display device 500 may be a light emitting diode display. The display device 500 of FIG. 5 is substantially the same as the display device 400 of FIG. 4. The difference between the display device 500 of FIG. 5 and the display device 400 of FIG. 4 is that the connection manners of the power source 410, the LED load 120, the power source 420 and the switch unit 430 are different. In the display device 500 of FIG. 5, the power source 410 may be electrically connected to the power source 420 and the switch unit 430. The LED load 120 may be electrically connected between the power source 420 and the switch unit 430. The operation of the display device 500 of FIG. 5 is the same as or similar to the operation of the display device 400 of FIG. 4. Accordingly, the operation of the display device 500 of FIG. 5 may refer to the description of the embodiment of FIG. 4, and the description thereof is not repeated herein.

Figure 6:
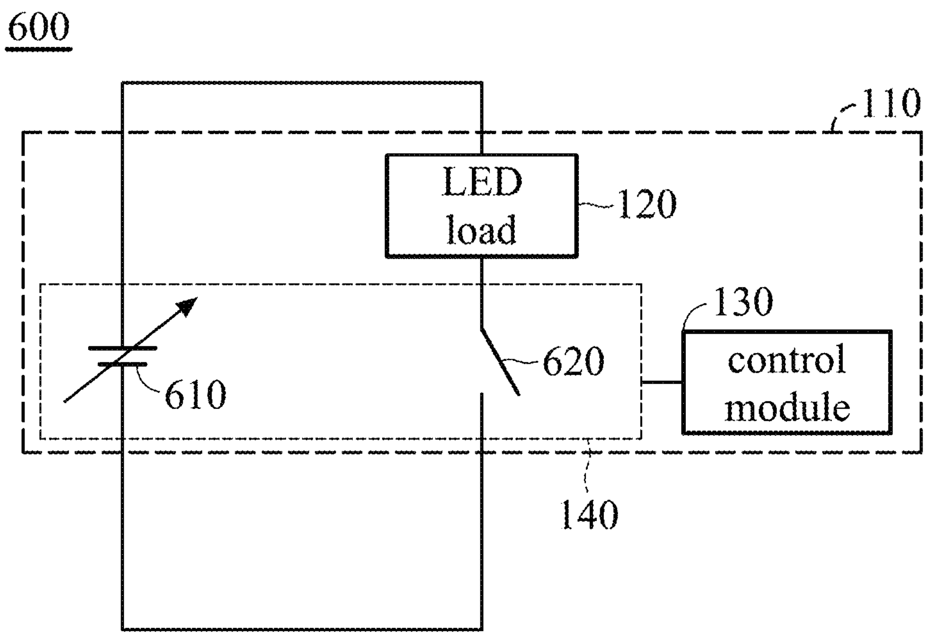
FIG. 6 is a schematic view of a display device according to an embodiment of the disclosure.

FIG. 6 is a schematic view of a display device according to an embodiment of the disclosure. In the embodiment, the display device 600 may be a light emitting diode display. Please refer to FIG. 6. The display device 600 may include an LED driving device 110, and the LED driving device 110 may include an LED load 120, a control module 130 and a driving module 140. In the embodiment, the LED load 120, the LED driving device 110, the control module 130 and the driving module 140 in FIG. 6 are the same or similar to the LED load 120, the LED driving device 110, the control module 130 and the driving module 140 in FIG. 1. Accordingly, the LED load 120, the LED driving device 110, the control module 130 and the driving module 140 in FIG. 6 may refer to the description of the embodiment of FIG. 1, and the description thereof is not repeated herein.

The driving module 140 may include a power source 610 and a switch unit 620. In the embodiment, the power source 610 may be a voltage source, but the disclosure in not limited thereto. The switch unit 620 may be electrically connected between the LED load 120 and the power source 610.

The power source 610 and the switch unit 620 may generate the driving signal to the LED load 120 according to the pulse intensity, the pulse width and the pulse density generated by the control module 130. In the embodiment, the voltage magnitude of the power source 610 (i.e., the voltage source) may be related to the pulse intensity. That is, when the pulse intensity is larger, the voltage of the power source 610 (i.e., the voltage source) is larger. When the pulse intensity is smaller, the voltage of the power source 610 (i.e., the voltage source) is smaller.

In addition, the on time of the switch unit 620 may be related to the pulse width. That is, when the pulse width is larger, the on time of the switch unit 620 is longer. When the pulse width is smaller, the on time of the switch unit 620 is shorter. Furthermore, the number of turning on the switch unit 620 may be related to the pulse density. That is, when the pulse density (the pulse number) is larger, the number of turning on the switch unit 620 becomes more. When the pulse density (the pulse number) is smaller, the number of turning on the switch unit 620 becomes less.

Figure 7:
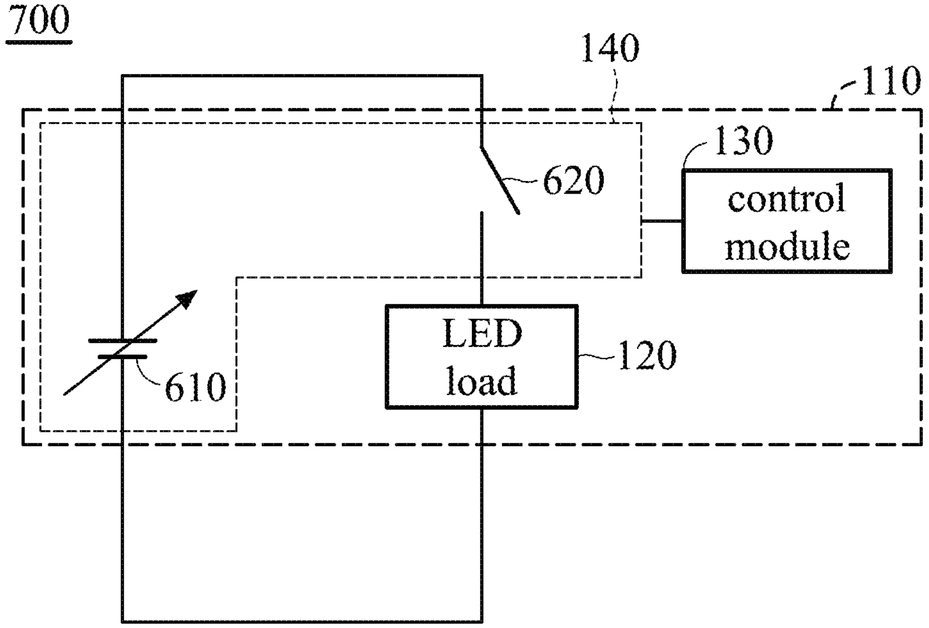
FIG. 7 is a schematic view of a display device according to an embodiment of the disclosure.

FIG. 7 is a schematic view of a display device according to an embodiment of the disclosure. In the embodiment, the display device 700 may be a light emitting diode display. The display device 700 of FIG. 7 is substantially the same as the display device 600 of FIG. 6. The difference between the display device 700 of FIG. 7 and the display device 600 of FIG. 6 is that the connection manners of the LED load 120, the power source 610 and the switch unit 620 are different. In the display device 700 of FIG. 7, the LED load 120 may be electrically connected between the power source 610 and the switch unit 620. The operation of the display device 700 of FIG. 7 is the same as or similar to the operation of the display device 600 of FIG. 6. Accordingly, the operation of the display device 700 of FIG. 7 may refer to the description of the embodiment of FIG. 6, and the description thereof is not repeated herein.

In the light emitting diode display devices 400, 500, 600 and 700, the LED load 120 may include a light emitting element driven according to the pulse width modulation (PWM), such as the light emitting diode (LED) chip or the package structure including the LED. Furthermore, the LED load 120 includes RGB pixels formed by the LED chips or the package structures including the LED chips.

Figure 8:
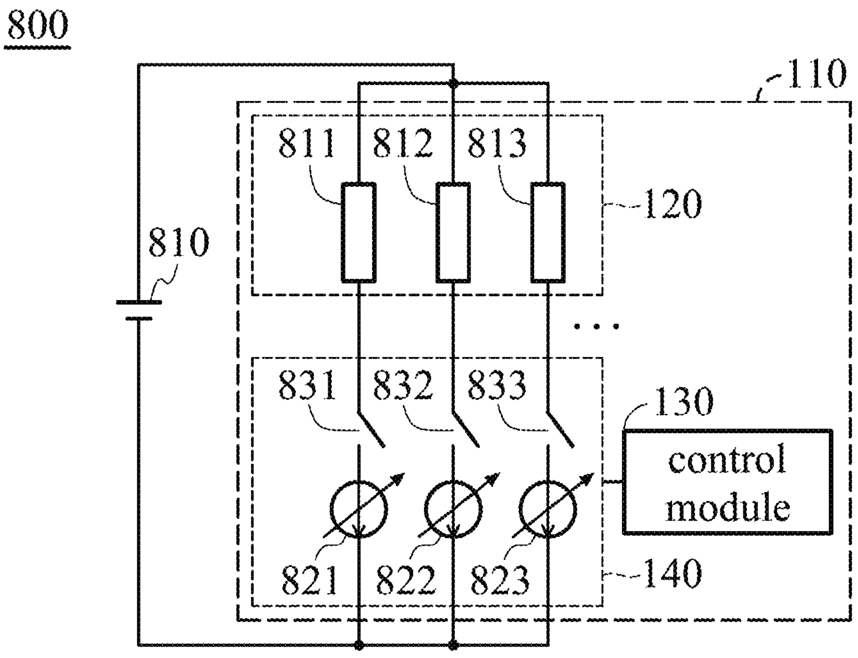
FIG. 8 is a schematic view of a display device according to an embodiment of the disclosure.

FIG. 8 is a schematic view of a display device according to an embodiment of the disclosure. In the embodiment, the display device 800 may be a light emitting diode display. Please refer to FIG. 8. The display device 800 may include an LED driving device 110 and a power source 810. The LED driving device 110 may include an LED load 120, a control module 130 and a driving module 140. In the embodiment, the LED load 120, the LED driving device 110, the control module 130 and the driving module 140 in FIG. 8 are the same or similar to the LED load 120, the LED driving device 110, the control module 130 and the driving module 140 in FIG. 1. Accordingly, the LED load 120, the LED driving device 110, the control module 130 and the driving module 140 in FIG. 8 may refer to the description of the embodiment of FIG. 1, and the description thereof is not repeated herein.

The power source 810 may be electrically connected to the LED load 120 and the driving module 140. In the embodiment, the power source 810 may be a voltage source, but the disclosure is not limited thereto. The LED load 120 may include a light emitting element 811, a light emitting element 812 and a light emitting element 813 driven according to the pulse width modulation (PWM). The light emitting element 811, the light emitting element 812 and the light emitting element 813 may be electrically connected to the power source 810. That is, the light emitting element 811, the light emitting element 812 and the light emitting element 813 may share the power source 810. In the embodiment, the light emitting element 811, the light emitting element 812 and the light emitting element 813 may be light emitting diode (LED) chips or package structures including LED chips. Furthermore, the LED load 120 includes RGB pixels formed by the LED chips or the package structures including the LED chips.

The driving module 140 may include a power source 821, a power source 822, a power source 823, a switch unit 831, a switch unit 832 and a switch unit 833. In the embodiment, the power source 821, the power source 822 and the power source 823 may be current sources, but the disclosure is not limited thereto. The switch unit 831 may be electrically connected between the light emitting element 811 and the power source 821. The switch unit 832 may be electrically connected between the light emitting element 812 and the power source 822. The switch unit 833 may be electrically connected between the light emitting element 813 and the power source 823.

The manner for generating the driving signal by the power sources 821~823 and the switch units 831~833 may be the same as or similar to the manner for generating the driving signal by the power source 420 and the switch unit 430 in FIG. 4. Accordingly, the manner for generating the driving signal by the power sources 821~823 and the switch units 831~833 may refer to the description of the embodiment of FIG. 4, and the description thereof is not repeated herein.

Figure 9:
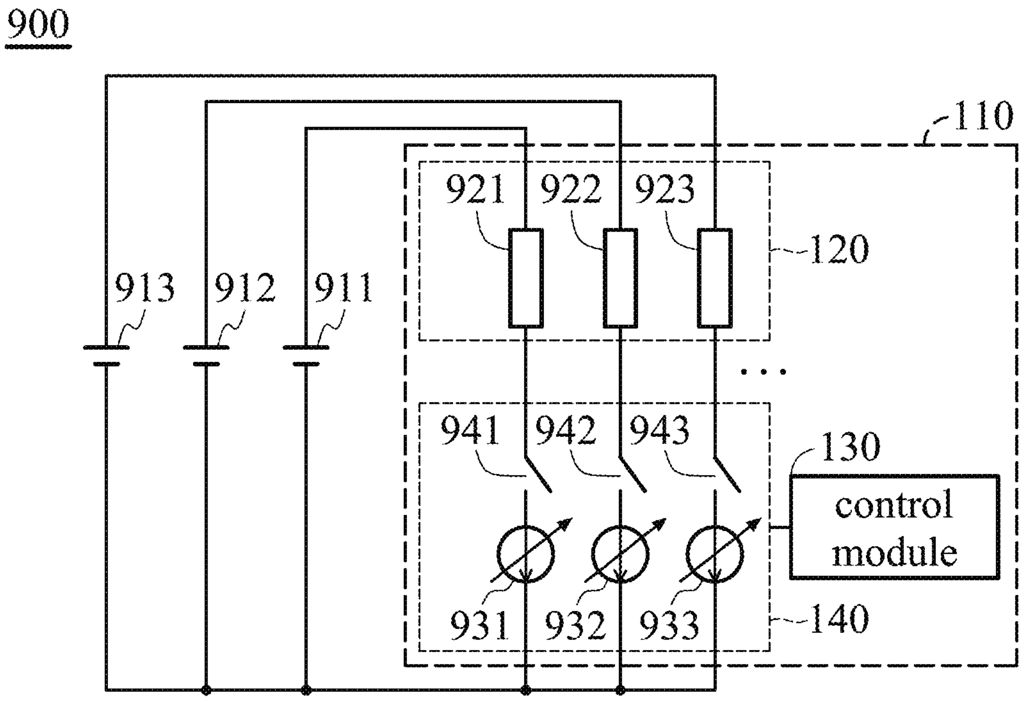
FIG. 9 is a schematic view of a display device according to an embodiment of the disclosure.

FIG. 9 is a schematic view of a display device according to an embodiment of the disclosure. In the embodiment, the display device 900 may be a light emitting diode display. Please refer to FIG. 9. The display device 900 may include an LED driving device 110, a power source 911, a power source 912 and a power source 913. The LED driving device 110 may include an LED load 120, a control module 130 and the driving module 140. In the embodiment, the LED load 120, the LED driving device 110, the control module 130 and the driving module 140 in FIG. 9 are the same or similar to the LED load 120, the LED driving device 110, the control module 130 and the driving module 140 in FIG. 1. Accordingly, the LED load 120, the LED driving device 110, the control module 130 and the driving module 140 in FIG. 9 may refer to the description of the embodiment of FIG. 1, and the description thereof is not repeated herein.

The power source 911, the power source 912 and the power source 913 may be electrically connected to the LED load 120 and the driving module 140. In the embodiment, the power source 911, the power source 912 and the power source 913 may be voltage sources, but the disclosure is not limited thereto. The LED load 120 may include a light emitting element 921, a light emitting element 922 and a light emitting element 923 driven according to the pulse width modulation (PWM). The light emitting element 921 may be electrically connected to the power source 911. The light emitting element 922 may be electrically connected to the power source 912. The light emitting element 923 may be electrically connected to the power source 913. In the embodiment, the light emitting element 921, the light emitting element 922 and the light emitting element 923 may be light emitting diode (LED) chips or package structures including LED chips. Furthermore, the LED load 120 includes RGB pixels formed by the LED chips or the package structure including the LED chips.

The driving module 140 may include a power source 931, a power source 932, a power source 933, a switch unit 941, a switch unit 942 and a switch unit 943. In the embodiment, the power source 931, the power source 932 and the power source 933 may be current sources, but the disclosure is not limited thereto. The switch unit 941 may be electrically connected between the light emitting element 921 and the power source 931. The switch unit 942 may be electrically connected between the light emitting element 922 and the power source 932. The switch unit 943 may be electrically connected between the light emitting element 923 and the power source 933.

The manner for generating the driving signal by the power sources 931~933 and the switch units 941~943 may be the same as or similar to the manner for generating the driving signal by the power source 420 and the switch unit 430 in FIG. 4. Accordingly, the manner for generating the driving signal by the power sources 931~933 and the switch units 941~943 may refer to the description of the embodiment of FIG. 4, and the description thereof is not repeated herein.

Figure 10:
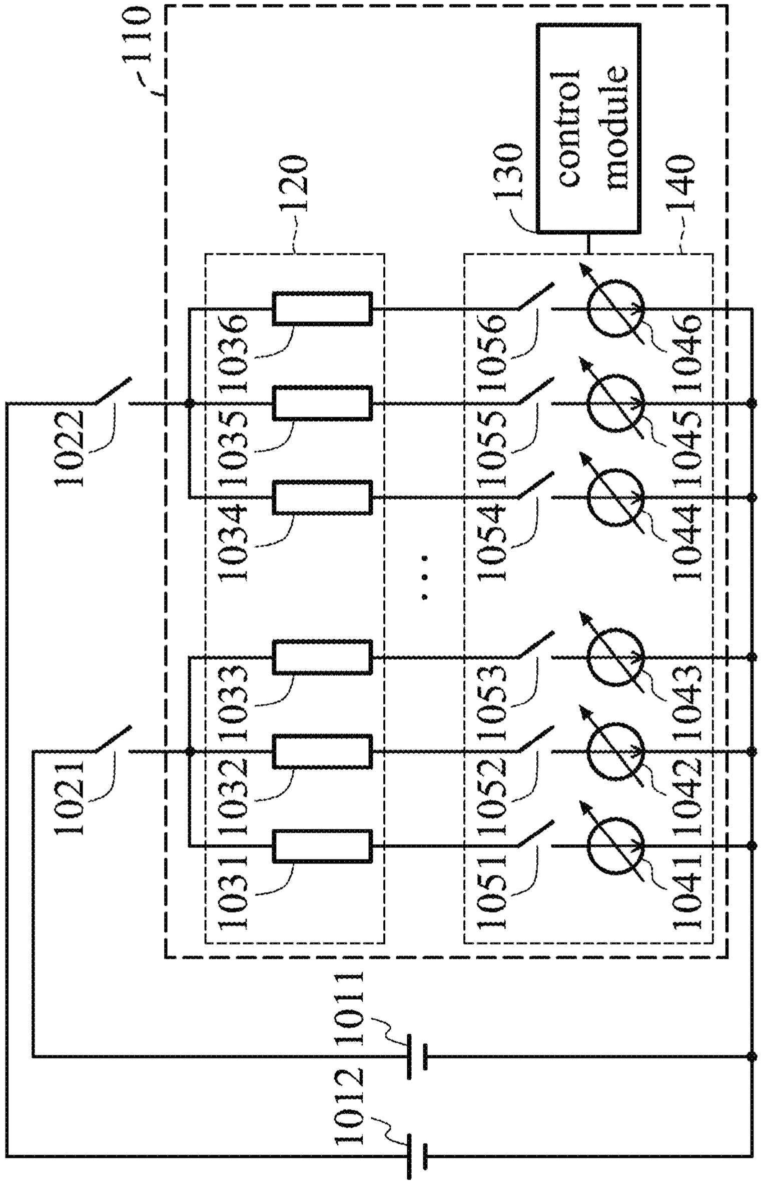
FIG. 10 is a schematic view of a display device according to an embodiment of the disclosure.

FIG. 10 is a schematic view of a display device according to an embodiment of the disclosure. In the embodiment, the display device 1000 may be a light emitting diode display. Please refer to FIG. 10. The display device 1000 may include an LED driving device 110, a power source 1011, a power source 1012, a switch unit 1021 and a switch unit 1022. The LED driving device 110 may include an LED load 120, a control module 130 and a driving module 140. In the embodiment, the LED load 120, the LED driving device 110, the control module 130 and the driving module 140 in FIG. 10 are the same or similar to the LED load 120, the LED driving device 110, the control module 130 and the driving module 140 in FIG. 1. Accordingly, the LED load 120, the LED driving device 110, the control module 130 and the driving module 140 in FIG. 10 may refer to the description of the embodiment of FIG. 1, and the description thereof is not repeated herein.

The power source 1011 may be electrically connected to the switch unit 1021 and the driving module 140. The power source 1012 may be electrically connected to the switch unit 1022 and the driving module 140. In the embodiment, the power source 1011 and the power source 1012 may be voltage sources, but the disclosure is not limited thereto. The LED load 120 may include a light emitting element 1031, a light emitting element 1032, a light emitting element 1033, a light emitting element 1034, a light emitting element 1035 and a light emitting element 1036 driven according to the pulse width modulation (PWM).

The light emitting element 1031, the light emitting element 1032 and the light emitting element 1033 may be electrically connected to the switch unit 1021. That is, the light emitting element 1031, the light emitting element 1032 and the light emitting element 1033 may share the power source 1011 through the switch unit 1021. The light emitting element 1034, the light emitting element 1035 and the light emitting element 1036 may be electrically connected to the switch unit 1022. That is, the light emitting element 1034, the light emitting element 1035 and the light emitting element 1036 may share the power source 1012 through the switch unit 1022, In the embodiment, the light emitting element 1031, the light emitting element 1032, the light emitting element 1033, the light emitting element 1034, the light emitting element 1035 and the light emitting element 1036 may be light emitting diode (LED) chips or package structures including LED chips. Furthermore, when the display device 1000 is a light emitting diode display, the LED load 120 includes RGB pixels formed by the LED chips or the package structures including the LED chips.

The driving module 140 may include a power source 1041, a power source 1042, a power source 1043, a power source 1044, a power source 1045, a power source 1046, a switch unit 1051, a switch unit 1052, a switch unit 1053, a switch unit 1054, a switch unit 1055 and a switch unit 1056. In the embodiment, the power source 1041, the power source 1042, the power source 1043, the power source 1044, the power source 1045 and the power source 1046 may be current sources, but the disclosure is not limited thereto.

The switch unit 1051 may be electrically connected between the light emitting element 1031 and the power source 1041. The switch unit 1052 may be electrically connected between the light emitting element 1032 and the power source 1042. The switch unit 1053 may be electrically connected between the light emitting element 1033 and the power source 1043. The switch unit 1054 may be electrically connected between the light emitting element 1034 and the power source 1044. The switch unit 1055 may be electrically connected between the light emitting element 1035 and the power source 1045. The switch unit 1056 may be electrically connected between the light emitting element 1036 and the power source 1046.

The manner for generating the driving signal by the power sources 1041~1046 and the switch units 1051~1056 may be the same as or similar to the manner for generating the driving signal by the power source 420 and the switch unit 430 in FIG. 4. Accordingly, the manner for generating the driving signal by the power sources 1041~1046 and the switch units 1051~1056 may refer to the description of the embodiment of FIG. 4, and the description thereof is not repeated herein.

Figure 11:
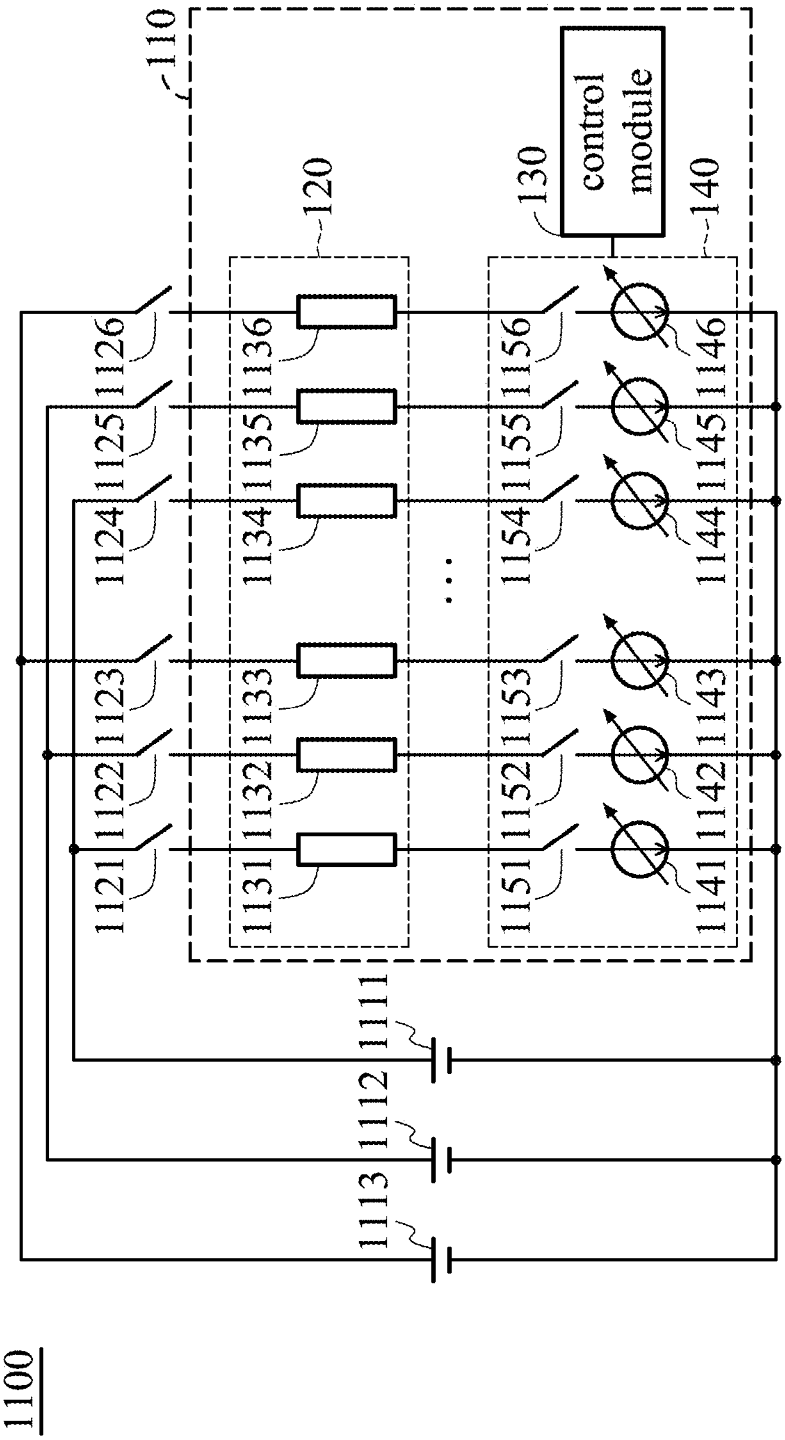
FIG. 11 is a schematic view of a display device according to an embodiment of the disclosure.

FIG. 11 is a schematic view of a display device according to an embodiment of the disclosure. In the embodiment, the display device 1100 may be a light emitting diode display. Please refer to FIG. 11. The display device 1100 may include an LED driving device 110, a power source 1111, a power source 1112 and a power source 1113. The LED driving device 110 may include an LED load 120, a control module 130 and the driving module 140. In the embodiment, the LED load 120, the LED driving device 110, the control module 130 and the driving module 140 in FIG. 11 are the same or similar to the LED load 120, the LED driving device 110, the control module 130 and the driving module 140 in FIG. 1. Accordingly, the LED load 120, the LED driving device 110, the control module 130 and the driving module 140 in FIG. 11 may refer to the description of the embodiment of FIG. 1, and the description thereof is not repeated herein.

The power source 1111 may be electrically connected to the switch unit 1121, the switch unit 1124 and the driving module 140. The power source 1112 may be electrically connected to the switch unit 1122, the switch unit 1125 and the driving module 140. The power source 1113 may be electrically connected to the switch unit 1123, the switch unit 1126 and the driving module 140. In the embodiment, the power source 1111, the power source 1112 and the power source 1113 may be voltage source, but the disclosure is not limited thereto. The LED load 120 may include a light emitting element 1131, a light emitting element 1132, a light emitting element 1133, a light emitting element 1134, a light emitting element 1135 and a light emitting element 1136 driven according to the pulse width modulation (PWM).

The light emitting element 1131 may be electrically connected to the switch unit 1121. The light emitting element 1132 may be electrically connected to the switch unit 1122. The light emitting element 1133 may be electrically connected to the switch unit 1123. The light emitting element 1134 may be electrically connected to the switch unit 1124. The light emitting element 1135 may be electrically connected to the switch unit 1125. The light emitting element 1136 may be electrically connected to the switch unit 1126. In the embodiment, the light emitting element 1131, the light emitting element 1132, the light emitting element 1133, the light emitting element 1134, the light emitting element 1135 and the light emitting element 1136 may be light emitting diode (LED) chips or package structures including LED chips. Furthermore, the LED load 120 includes RGB pixels formed by the LED chips or the package structures including the LED chips.

The driving module 140 may include a power source 1141, a power source 1142, a power source 1143, a power source 1144, a power source 1145, a power source 1146, a switch unit 1151, a switch unit 1152, a switch unit 1153, a switch unit 1154, a switch unit 1155 and a switch unit 1156. In the embodiment, the power source 1141, the power source 1142, the power source 1143, the power source 1144, the power source 1145 and the power source 1146 may be current sources, but the disclosure is not limited thereto.

The switch unit 1151 may be electrically connected between the light emitting element 1131 and the power source 1141. The switch unit 1152 may be electrically connected between the light emitting element 1132 and the power source 1142. The switch unit 1153 may be electrically connected between the light emitting element 1133 and the power source 1143. The switch unit 1154 may be electrically connected between the light emitting element 1134 and the power source 1144. The switch unit 1155 may be electrically connected between the light emitting element 1135 and the power source 1145. The switch unit 1156 may be electrically connected between the light emitting element 1136 and the power source 1146.

The manner for generating the driving signal by the power sources 1141~1146 and the switch units 1151~1156 may be the same as or similar to the manner for generating the driving signal by the power source 420 and the switch unit 430 in FIG. 4. Accordingly, the manner for generating the driving signal by the power sources 1141~1146 and the switch units 1151~1156 may refer to the description of the embodiment of FIG. 4, and the description thereof is not repeated herein.

Figure 12:
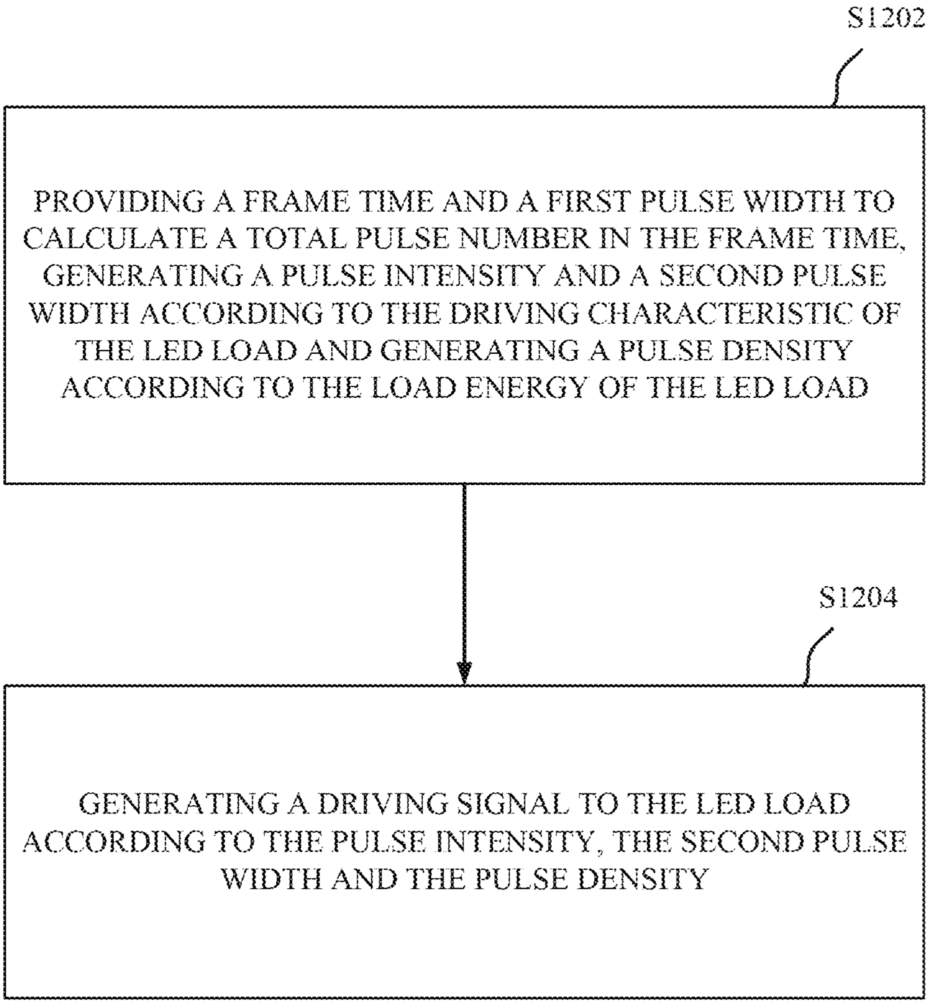
FIG. 12 is a flowchart of a driving method according to an embodiment of the disclosure.
Figure 13:
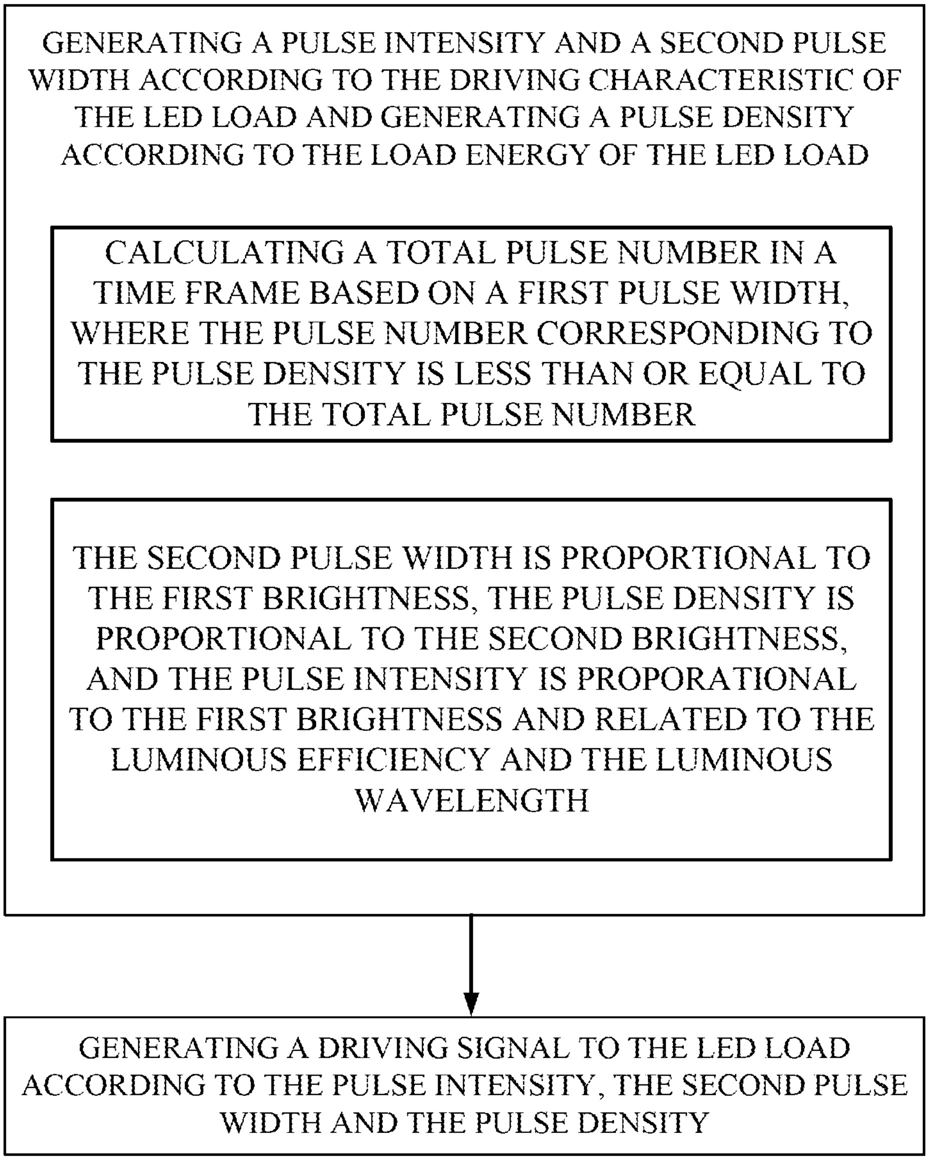
FIG. 13 is a flowchart of a driving method according to an embodiment of the disclosure.

FIG. 12 is a flowchart of a driving method according to an embodiment of the disclosure. FIG. 13 is a flowchart further describing a driving method according to an embodiment of the disclosure. In step S1202, the method involves providing a frame time and a first pulse width to calculate a total pulse number in the frame time, generating a pulse intensity and a second pulse width according to the driving characteristic of the LED load, and generating a pulse density according to the load energy of the LED load. In step S1204, the method involves generating a driving signal to the LED load according to the pulse intensity, the second pulse width and the pulse density. In some embodiments, the pulse number corresponding to the above-mentioned pulse density is, for example, less than or equal to the total pulse number. In some embodiments, the driving characteristic may include the first brightness, the luminous wavelength and the luminous efficiency, and the load energy may correspond to the second brightness.

In summary, according to the display device and the LED driving device thereof disclosed by the embodiments of the disclosure, the control module provides the frame time and the first pulse width to calculate the total pulse number in the frame time, generates the pulse intensity and the second pulse width according to the driving characteristic of the LED load, and generates the pulse density according to the load energy of the LED load, and the driving module generates the driving signal to the LED load according to the pulse intensity, the second pulse width and the pulse density. Therefore, it may increase the linearity of the adjustment of the driving signal, decrease the impact on the driving characteristic of the driving terminal (i.e., the LED load), and increase the convenience of use.

While the disclosure has been described by way of example and in terms of the embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An LED driving device, comprising:

an LED load having a driving characteristic, and a load energy;

a control module configured to generate:

a pulse intensity and a second pulse width according to the driving characteristic, a pulse density according to the load energy, and an adjusted pulse density by adjusting the pulse density to linearly adjust a second brightness after the pulse intensity and the second pulse width are determined; and a driving module configured to generate, via pulse width modulation:

a first driving signal to the LED load according to the pulse intensity, the second pulse width and the pulse density, and a second driving signal to the LED load according to the adjusted pulse density, the pulse intensity, and the second pulse width.

2. The LED driving device according to claim 1, wherein the control module calculates a total pulse number in a frame time based on a first pulse width, and a pulse number corresponding to the pulse density is less than or equal to the total pulse number.

3. The LED driving device according to claim 2, wherein the frame time is calculated according to a frame rate.

4. The LED driving device according to claim 3, wherein the frame rate is provided by an image source or is preset in the control module.

5. The LED driving device according to claim 1, wherein the driving characteristic comprises a first brightness, a luminous wavelength and a luminous efficiency, and the load energy corresponds to the second brightness.

6. The LED driving device according to claim 5, wherein the second pulse width is proportional to the first brightness, the pulse density is proportional to the second brightness, and the pulse intensity is proportional to the first brightness and related to the luminous efficiency and the luminous wavelength.

7. The LED driving device according to claim 1, wherein the driving module comprises:

a power source; and a switch unit, electrically connected between the LED load and the power source;

wherein the power source and the switch unit generate the first driving signal to the LED load according to the pulse intensity, the second pulse width and the pulse density.

8. The LED driving device according to claim 1, wherein the load energy is an energy of a pulse multiplied by a pulse number corresponding to the pulse density.

9. A display device, comprising an LED driving device according to claim 1.

10. The display device according to claim 9, wherein the LED load comprises a plurality of LED pixels.

11. The display device according to claim 9, wherein a pulse number corresponding to the pulse density is less than or equal to a total pulse number, wherein the total pulse number is determined in a frame time based on a first pulse width.

12. The display device according to claim 11, wherein the frame time is calculated according to a frame rate.

13. The display device according to claim 12, wherein the frame rate is provided by an image source or is preset in the control module.

14. The display device according to claim 9, wherein the driving characteristic comprises a first brightness, a luminous wavelength and a luminous efficiency, and the load energy corresponds to the second brightness.

15. The display device according to claim 14, wherein the second pulse width is proportional to the first brightness, the pulse density is proportional to the second brightness, and the pulse intensity is proportional to the first brightness and related to the luminous efficiency and the luminous wavelength.

16. The display device according to claim 9, wherein the driving module comprises:

a power source; and a switch unit, electrically connected between the LED load and the power source;

wherein the power source and the switch unit generate the first driving signal to the LED load according to the pulse intensity, the second pulse width and the pulse density.

17. The display device according to claim 9, wherein the load energy is an energy of a pulse multiplied by a pulse number corresponding to the pulse density.

* * * * *